(12) United States Patent
Thomas et al.

(10) Patent No.: US 12,728,524 B2
(45) Date of Patent: Sep. 8, 2026

(54) DYNAMICALLY CONTROLLING DAMPING IN AN INDUSTRIAL ENVIRONMENT

(71) Applicant: INTERNATIONAL BUSINESS MACHINES CORPORATION, Armonk, NY (US)

(72) Inventors: Binoy Thomas, Kozhikode (IN); Sudheesh S. Kairali, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 18/538,680

(22) Filed: Dec. 13, 2023

(65) Prior Publication Data

US 2025/0196329 A1 Jun. 19, 2025

(51) Int. Cl.

| | |
|---|---|
| ***B25J 9/16*** | (2006.01) |
| ***F16F 15/00*** | (2006.01) |
| ***F16F 15/02*** | (2006.01) |

(52) U.S. Cl.

CPC ........... *B25J 9/1605* (2013.01); *F16F 15/002* (2013.01); *F16F 15/02* (2013.01); *F16F 2222/08* (2013.01); *F16F 2230/18* (2013.01)

(58) Field of Classification Search

CPC ........ B25J 9/1605; F16F 15/002; F16F 15/02; F16F 2222/08; F16F 2230/18

See application file for complete search history.

(56) References Cited

U.S. PATENT DOCUMENTS

| | | | | |
|---|---|---|---|---|
| 9,440,353 | B1 * | 9/2016 | da Silva | B25J 9/1633 |
| 2005/0229650 | A1 * | 10/2005 | Kim | D06F 58/26 68/23.2 |
| 2009/0294234 | A1 | 12/2009 | Kashani | |
| 2018/0354630 | A1 * | 12/2018 | Nakhjavani | G06N 3/084 |
| 2019/0003554 | A1 * | 1/2019 | Nagai | F16F 15/145 |
| 2019/0047689 | A1 * | 2/2019 | Muren | B64C 27/48 |
| 2019/0294171 | A1 * | 9/2019 | Maeda | G05D 1/0231 |
| 2020/0150644 | A1 | 5/2020 | Cella et al. | |
| 2020/0168339 | A1 * | 5/2020 | Correnti | G16H 50/30 |
| 2020/0182323 | A1 * | 6/2020 | Ott | F16F 7/1005 |
| 2022/0163960 | A1 | 5/2022 | Cella et al. | |
| 2022/0170818 | A1 | 6/2022 | Sundararajan et al. | |
| 2023/0012799 | A1 * | 1/2023 | Aguilar Armendariz | G01M 1/32 |
| 2023/0135412 | A1 * | 5/2023 | Moore | B23Q 3/088 29/407.07 |

OTHER PUBLICATIONS

Digital_Twin_Based_Virtual_Sensor_for_Online_Fatigue (Year: 2022).*

(Continued)

*Primary Examiner* — Mohamad O El Sayah
(74) *Attorney, Agent, or Firm* — Seed Intellectual Property Law Group LLP

(57) ABSTRACT

A method, system, and computer program product are configured to: determine a location in an industrial system and an amount of mass based on predicting, using a digital twin of the industrial system, that adding the amount of mass to the location will reduce a vibration in the industrial system; and control a robot to position a movable object at the location, the movable object having a mass equal to the amount of mass.

14 Claims, 3 Drawing Sheets

(56) References Cited

OTHER PUBLICATIONS

Vibration_monitoring_and_analysis_of_strip_rolling_mill (Year: 2022).*
Don et al., "Digital Twinning Methodology for Vibration Prediction and Fatigue Life Prognosis of Vertical Oil Well Drillstrings", https://ieeexplore.ieee.org/stamp/stamp.jsp?arnumber=10156837, Jun. 20, 2023; 14 Pages.
Pinte et al., "Active or adaptive-passive device for vibration control of rotating elements," IP.com No. IPCOM000197398D, Jul. 7, 2010; 6 Pages.
Li et al., "Physical modeling for digital twin of Continuous Damping Control damper", https://www.sciencedirect.com/science/article/abs/pii/S1526612523004747?via%3Dihub, Aug. 4, 2023; 6 Pages.
Darcy, "Damping Ratio Calculator", https://www.omnicalculator.com/physics/damping-ratio, Accessed Dec. 12, 2023; 7 Pages.
Zhai et al., "Vibration Control System With Digitally Adjustable Electromagnetic Damping and Stiffness", https://www.researchgate.netpublication/278353088_VIBRATION_CONTROL_SYSTEM_WITH_DIGITALLY_ADJUSTABLE_ELECTROMAGNETIC_DAMPING_AND_STIFFNESS, Nov. 2014; 4 Pages.
Waites, "Wireless Vibration Monitoring Sensors", https://sensors.waites.net/condition-monitoring/, Accessed Dec. 12, 2023; 4 Pages.
Bower et al., "Introduction to dynamics and vibrations", https://www.brown.edu/Departments/Engineering/Courses/En4/Notes/vibrations_forced/vibrations_forced.htm, Accessed Dec. 12, 2023; 14 Pages.
Murphy, "The Manufacturing Side of Digital Transformation: Smart Factories", https://web.archive.org/web/20230426194555/https://www.ibm.com/blogs/think/2019/03/the-manufacturing-side-of-digital-transformation-smart-factories/, Mar. 4, 2019; 6 Pages.
IBM, "What is a digital twin?", https://www.ibm.com/topics/what-is-a-digital-twin, Accessed Dec. 12, 2023; 11 Pages.

* cited by examiner

DYNAMICALLY CONTROLLING DAMPING IN AN INDUSTRIAL ENVIRONMENT

BACKGROUND

Aspects of the present invention relate generally to industrial systems.

In any industrial floor, there can be different types of machines that can vibrate while working. The vibration can propagate from one machine to another machine through underlying structures and connectors between machines. Vibrations typically diminish along a length of a propagation path due to damping. The damping ratio is a dimensionless measure describing how oscillations in a system decay after a disturbance. Many systems exhibit oscillatory behavior when they are disturbed from their position of static equilibrium.

SUMMARY

In a first aspect of the invention, there is a computer-implemented method including: determining, by a processor set, a location in an industrial system and an amount of mass based on predicting, using a digital twin of the industrial system, that adding the amount of mass to the location will reduce a vibration in the industrial system; and controlling, by the processor set, a robot to position a movable object at the location, the movable object having a mass equal to the amount of mass. Additional aspects of the invention are directed to a computer program product and a system, each of which comprises program instructions that are executable to perform the method.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
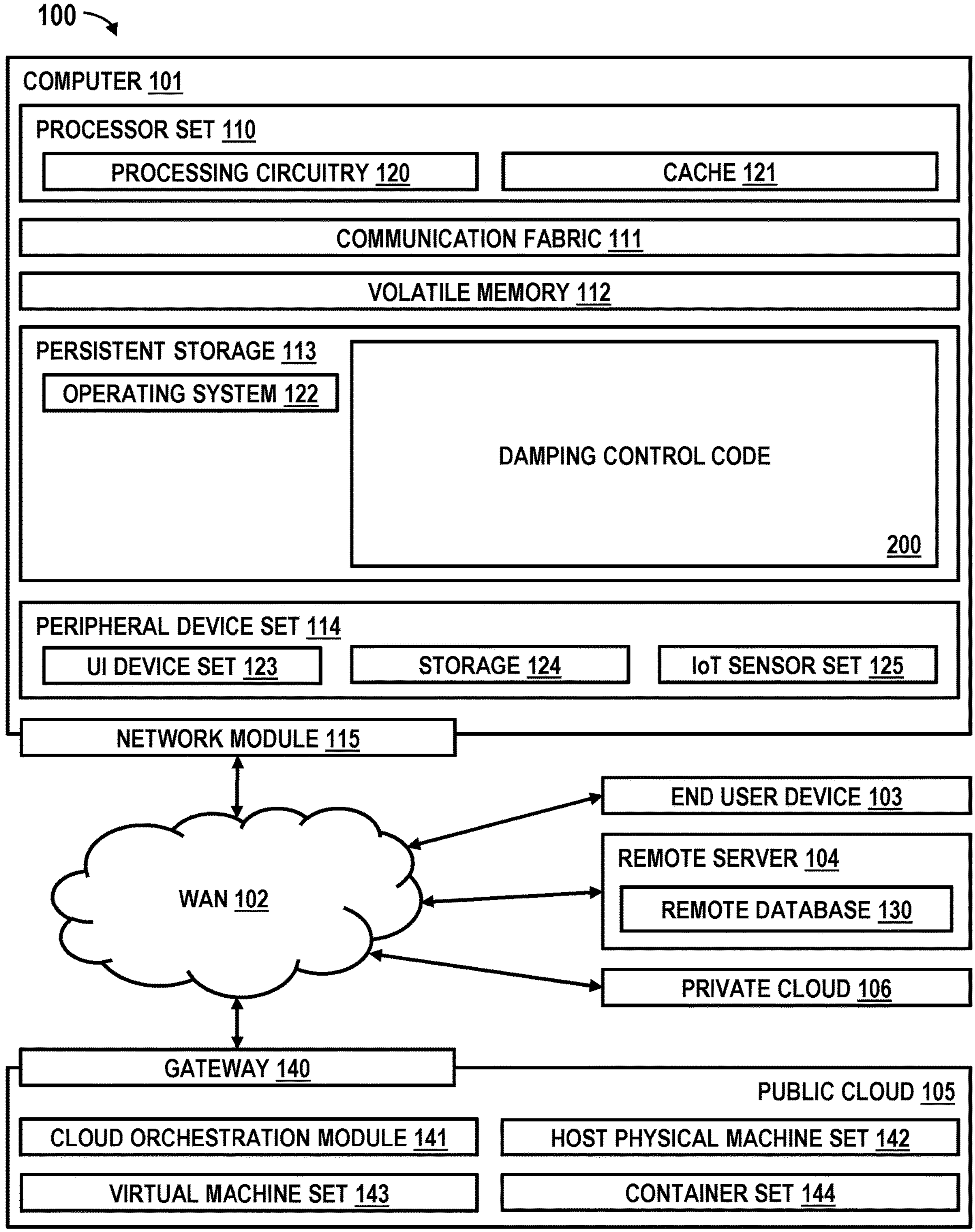
FIG. 1 depicts a computing environment according to an embodiment of the present invention.

Aspects of the present invention relate generally to industrial systems. Implementations of the invention use a digital twin to simulate how a vibration will propagate in an industrial system such as from one machine to another machine, from a machine to a structure, and from a machine to an object being worked on by the machine or another machine. In implementations, the simulations involve adjusting the damping ratio of various parts of the industrial system by adding amounts of mass at locations in the industrial system, thereby modifying the damping ratio of the various parts to which mass is added. In implementations, a system uses the simulations to determine one or more locations in the industrial system and one or more amounts of mass to place at the locations to dampen a particular vibration. In implementations, based on determining a location and an amount of mass in this manner, the system deploys a robot that navigates to the determined location in the industrial system and physically places an object having the determined amount of mass at the determined location. In this manner, the system changes the damping ratio of an object in the industrial system in a way that attenuates the vibration in the industrial system.

In various embodiments, the system prioritizes different vibrations in the industrial system based on activities performed by machines in the industrial system. For example, a first vibration that affects a high precision laser cutting activity may be prioritized higher than a second vibration that affects a washing activity. In embodiments, the system controls the robot based on the prioritization, e.g., to address a higher priority vibration before addressing a lower priority vibration.

In various embodiments, the system uses the digital twin to determine whether a vibration can be sufficiently attenuated by adding mass at one or more locations in the industrial system. For example, the system may run simulations to determine if a vibration can be attenuated to a magnitude less than a predefined threshold. In embodiments, in response to determining a vibration cannot be sufficiently attenuated, the system generates an alert to a user, where the alert advises repairing a machine associated with the vibration.

In various embodiments, the system determines a change in the activities being performed in the industrial system, determines a change in vibrations based on the change in the activities, and determines at least one new location and new amount of mass based on the change in vibrations. Based on this, the system may deploy the robot to place an object having the new amount of mass at the new location. This may involve repositioning objects in the industrial system such as by moving an object from one location in the industrial system (e.g., for attenuating a first vibration) to another location in the industrial system (e.g., for attenuating a second vibration).

In various embodiments, the system considers external influencing factors, such as wind flow, for example, and whether those factors affect a vibration in the industrial system. This may involve running simulations using the digital twin to model vibrations based at least in part on the external factors, and determining the location and amount of mass based on such simulations.

Industrial systems often include machines that operate to perform various functions. Machines with moving parts generate vibrations that can propagate in the industrial system, such as from one machine to another machine through underlying structures and connectors between machines. Vibrations in the industrial system can be damaging to machines, structures, connectors, and work product (e.g., objects being worked on by machines). Implementations of the invention address this problem by attenuating vibrations in an industrial system using methods, systems, and computer program products that are configured to: determine a location in an industrial system and an amount of mass based on predicting, using a digital twin of the industrial system, that adding the amount of mass to the location will reduce a vibration in the industrial system; and control a robot to position a movable object at the location, the movable object having a mass equal to the amount of mass. In this manner, implementations of the invention provide an improvement in the technical field of industrial systems, the improvement including attenuating potentially damaging vibrations in an industrial system. The improvement is technical in nature because embodiments utilize a digital twin and a robot to achieve the improvement.

Implementations of the invention are necessarily rooted in computer technology. For example, a digital twin is inherently computer based since it is by definition a digital model of a real-world physical product, system, or process. Implementations of the invention also change the physical state of a system by moving one or more objects to different locations within the system.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as damping control code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
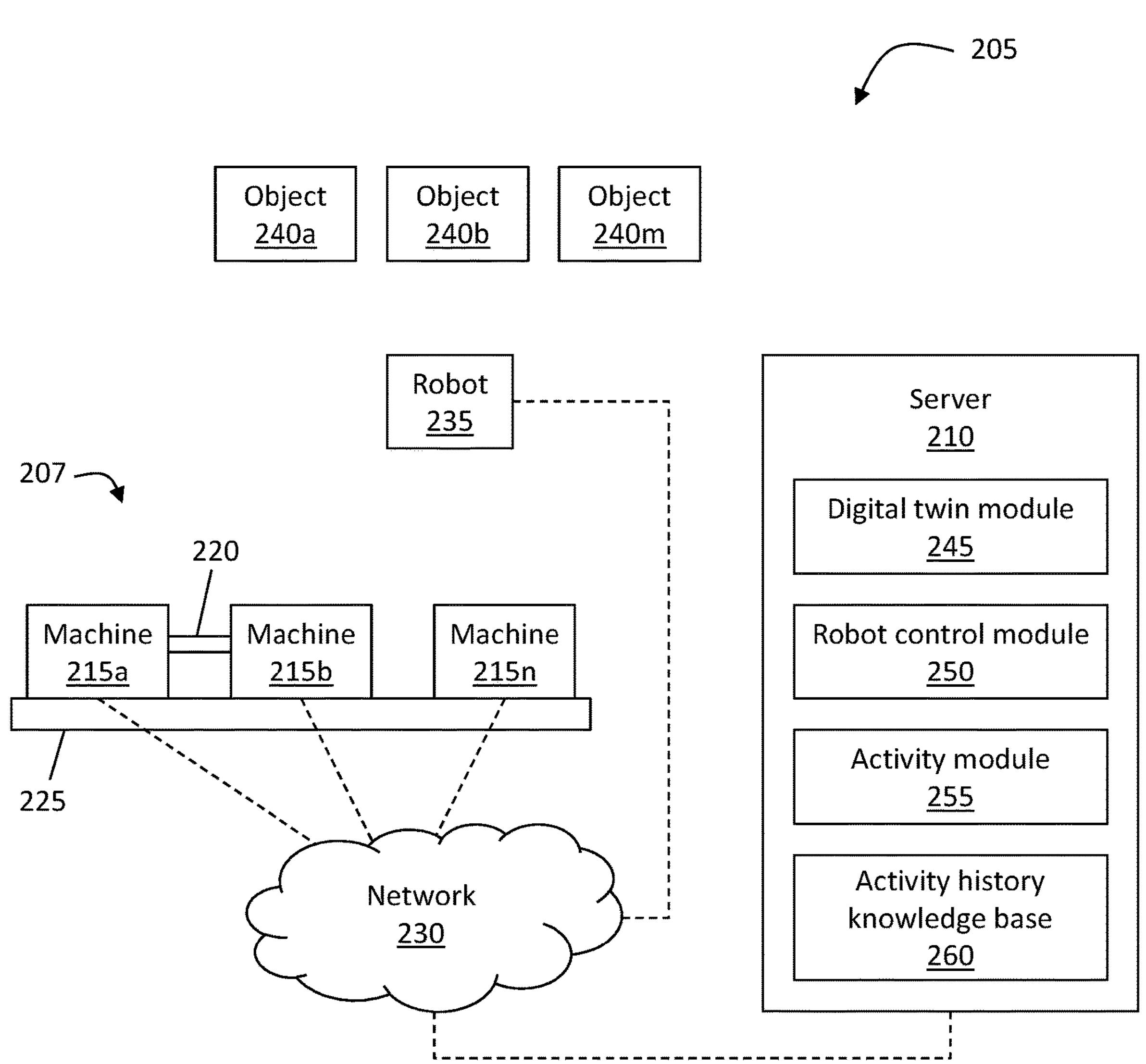
FIG. 2 shows a block diagram of an exemplary environment in accordance with aspects of the present invention.

FIG. 2 shows a block diagram of an exemplary environment 205 in accordance with aspects of the invention. In embodiments, the environment 205 includes a server 210 and machines 215*a*, 215*b*, . . . , 215*n* where "n" is any integer greater than zero. The environment 205 may comprise an industrial system 207 such as an industrial floor. The machines 215*a-n* may comprise any conventional or later developed machines including but not limited to printing machines, milling machines, stamping machines, cutting machines, and pumping machines. One or more of the machines 215*a-n* may be physically connected to one another by one or more connectors 220, which may include but are not limited to electrical connectors, plumbing, conveyors, etc. One or more of the machines 215*a-n* may be physically connected to various structures 225, which may include but are not limited to a floor, scaffold, shelf, rack, overhead truss, etc. The server 210 may be communicatively connected to one or more of the machines 215*a-n* via a network 230, which may comprise the WAN 103 of FIG. 1. The server 210 may monitor and/or control operation of one or more of the machines 215*a-n* via network communication via the network 230.

In embodiments, the environment 205 includes at least one robot 235 and objects 240*a*, 240*b*, . . . , 240*m* where "m" is any integer greater than zero. Each of the objects 240*a-m* has a mass associated with it. One or more of the objects 240*a-m* may have different masses. One or more of the objects 240*a-m* may have a same mass. The objects 240*a-m* are movable by the robot 235 to different locations in the industrial system 207. In a non-limiting example, each of the objects 240*a-m* comprises a metal object having a known mass that can be physically positioned at different locations in the industrial system 207. In a non-limiting example, each of the objects 240*a-m* comprises a connecting means, such as a hook, one or more magnets, etc., that permit the object to be physically connected to other elements in the industrial system 207. In embodiments, the robot 235 comprises a robotic device that is configured to move respective ones of the objects 240*a-m* to various locations in the industrial system 207 based on control signals received from the server 210, e.g., via the network 230. The robot 235 may be self-propelled for moving in and around the industrial system 207. The robot 235 may comprise an engagement mechanism configured to selectively engage and disengage ones of the objects 240*a-m*, such that the robot 235 may pick up one of the objects using the engagement system, move the object to a location in the industrial system 207, and disengage the object to place the object at the location. In this manner, the server 210 may control the robot 235 to cause the robot 235 to place respective ones of the objects 240*a-m* at respective locations in the industrial system 207.

The server 210 may comprise one or more instances of the computer 101 of FIG. 1. The server may alternatively comprise one or more virtual machines or one or more containers running on one or more instances of the computer 101 of FIG. 1. In embodiments, the server 210 comprises a digital twin module 245, a robot control module 250, and an activity module 255, each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The server 210 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

With continued reference to FIG. 2, and in accordance with aspects of the invention, the digital twin module 245 is configured model the industrial system 207 using a digital twin of the industrial system. In embodiments, the digital twin module 245 comprises programming that defines a digital twin of the industrial system 207, where the digital twin is a digital model that models vibrations in the industrial system including vibrations in the machines 215*a-n*, connectors 220, and structures 225 of the industrial system 207. The model may model the vibrations using damping ratios for various elements in the industrial system 207, where the damping ratio is given by Equation 1.

$$\zeta = \frac{c}{c_c} = \frac{c}{2\sqrt{\text{km}}} \tag{1}$$

In Equation 1, Zeta is the damping ratio, c is the actual damping, $c_c$ is the critical damping, k is the spring constant, and m is the mass.

In embodiments, the digital twin module 245 is configured to run simulations using the digital twin in which vibrations in the industrial system are modeled for situations where various ones of the machines 215*a-n* are running and where various amounts of mass are placed (e.g., added in the digital model) at different locations in the industrial system 207. The digital twin may also be configured to model the effect of external factors on the vibrations of the industrial system 207, such external factors including wind, for example. In this manner, the digital twin module 245 may be used to run simulations of how placing different amounts of mass at different locations in the industrial system 207 affects the vibrations in the industrial system. In embodiments, the digital twin module 245 uses the simulations to determine a location and an amount of mass at the location to provide an optimum amount of damping for a particular vibration in the industrial system 207. In various embodiments, an optimum amount of damping is an amount of damping that provides a highest reduction of a vibration being simulated.

In accordance with aspects of the invention, the robot control module 250 is configured to control the robot 235 to cause the robot 235 to place an amount of mass determined by the digital twin module 245 at a location determined by the digital twin module 245. In embodiments, the robot control module 250 determines which combination of one or more of the objects 240*a-m* has a mass that equals the amount of mass determined by the digital twin module. In one example, equals in this context may mean one or more of the objects 240*a-m* whose mass exactly matches the amount of mass determined by the digital twin module. In another example, equals in this context may mean one or more of the objects 240*a-m* whose mass is a closest possible match to the amount of mass determined by the digital twin module given a finite number of objects 240*a-m* from which to choose. In embodiments, the robot control module 250 sends one or more control signals to the robot 235 that instruct the robot 235 to: engage one or more of the objects 240*a-m* whose mass (i.e., singular or combined) equals the amount of mass determined by the digital twin module 245; move the one or more of the objects 240*a-m* to the location determined by the digital twin module 245; and disengage the one more of the objects 240*a-m* at the determined location such that the one or more of the objects 240*a-m* are placed at the determined location.

Still referring to FIG. 2, and in accordance with aspects of the invention, the activity module 255 is configured to predict times that one or more of the machines 215*a-n* perform their respective activities in the industrial system. In embodiments, the activity module 255 includes or communicates with an activity history knowledge base 260 that includes data defining past dates and times that each of the machines 215*a-n* has performed its respective activity. Activities may include but are not limited to a printing machine performing a printing action, a milling machine performing a milling action, a stamping machine performing a stamping action, a cutting machine performing a cutting action, and a pumping machine performing a pumping action. In embodiments, the activity module 255 uses one or more machine learning algorithms with the data in the activity history knowledge base 260 to determine patterns of when certain ones of the machines perform their respective activities. In embodiments, the activity module 255 uses the determined patterns to predict future times that the machines 215*a-n* will perform their respective activities. In embodiments, the digital twin module 245 uses the predicted future times of the activities to predict, using the digital twin, vibrations in the industrial system 207 at the future times based on which machines 215*a-m* will be performing their activities at the future times. In this manner, the server 210 may predict a vibration in the industrial system 207 (i.e., before the vibration occurs), determine a location and an amount of mass at the location (e.g., by running simulations as described herein) to attenuate the predicted vibration, and deploy the robot 235 to place one or more of the objects 240*a-n* at the determined location so that the mass of the one or more objects is in place prior to the time of the predicted vibration, so that the mass of the one or more objects attenuates the predicted vibration immediately when the predicted vibration begins.

For example, the activity module 255 may determine from analyzing the activity history knowledge base 260 that the machine 215*a* performs an activity every day at 9:00 am. In this example, the digital twin module 245 may use the predicted time to predict a vibration in the industrial system 207 caused by the machine 215*a* performing its activity at the predicted time, and the digital twin module 245 may determine an amount of mass and a location for the amount of mass that provides an optimum damping of this vibration. In this example, the robot control module 250 may determine that object 240*b* equals the amount of mass determined by the digital twin module 245. In this example, the robot control module 250 may deploy the robot 235, prior to the predicted time, to place object 240*b* at the location determined by the digital twin module 245.

With continued reference to FIG. 2, the activity module 255 may be configured to associate different vibrations with different activities in the industrial system 207 and rank the vibrations in a prioritized order. In embodiments, by running many different simulations of different combinations of which activities are occurring and not occurring in the industrial system 207, the digital twin module 245 may determine which activities cause which vibrations in the industrial system. Using this information, the activity module 255 may associate a vibration in the industrial system 207 with the activity that causes the vibration, and this may be done for a plurality of different vibrations modeled in the industrial system using the digital twin. In embodiments, the activity module 255 may prioritize each of the plurality of different vibrations using a scoring function that determines a priority score for each of the vibrations. The scoring function may take into account parameters such as a magnitude of the vibration, a measure of disruption the vibration causes to another activity in the industrial system 207, and a measure of vibration tolerance of other activities in the industrial system 207. For example, a vibration caused by a stamping machine activity may have a relatively high priority score based on it producing a high magnitude vibration at a cutting machine, the vibration occurring at a same time as a laser cutting activity of a cutting machine, and the laser cutting activity having a low level of vibration tolerance. In another example, a vibration caused by a milling activity of a milling machine may have a relatively low priority score based on it producing a low magnitude vibration at a pumping machine that has a high level of vibration tolerance. In embodiments, the robot control module 250 controls the robot 235 based on the priorities of the vibrations. For example, the robot control module 235 may deploy the robot 235 to place one or more objects to attenuate a vibration with a higher priority score before deploying the robot 235 to place one or more objects to attenuate a vibration with a lower priority score.

In accordance with further aspects of the invention, the server 210 is configured to determine a change in a plurality of activities in the industrial system 207 and to control the robot 235 to reposition one or more of the objects 240*a-m* in the industrial system 207 based on the change. For example, the activity control module 255 may determine that one or more current activities will end and/or that one or more activities will begin at a future time. Based on the change of activities, the digital twin module 245 may predict the vibrations in the industrial system at the future time and may determine new locations and new amounts of mass for the new locations to dampen the predicted vibrations. Based on this, the robot control module 250 may deploy the robot 235 to place ones of the objects 240*a-m* at the new locations, which may involve moving one or more of the objects 240*a-m* from one or more current locations in the industrial system 207 to one of the new locations.

Still referring to FIG. 2, and in accordance with further aspects of the invention, the server 210 is configured to determine that a particular one of a plurality of vibrations in the industrial system associated with a particular one of the plurality of activities cannot be sufficiently attenuated by adding mass to a location in the industrial system, and to generate an alert based on this, where the alert advises repairing of a machine associated with the particular one of the plurality of activities. In embodiments, the digital twin module 245 may determine, by running simulations with different amounts of mass at different locations in the industrial system 207, that a vibration associated with an activity caused by one of the machines 215*a-n* cannot be attenuated to a level below a predefined threshold amount. This situation, in which the vibration associated with one of the machines cannot be sufficiently attenuated by adding mass to the industrial system 207, may be indicative of the particular machine being in need of repair. As such, the digital twin module 245 may be configured to generate an alert when this situation is discovered.

With continued reference to FIG. 2, data defining a position of each of the machines 215*a-n*, connectors 220, and structures 225 may be stored in a database. The position may be a permanent position for static elements or may be a temporary position for mobile elements. Mobile elements may report their position to the server 210 using communication via the network 230.

In embodiments, the digital twin module 245 may utilize a digital twin library that models different parts (e.g., components) of each machine 215*a-n*, as well as each machine as a whole. In embodiments, the digital twin module 245 may use the digital twin to model the connectors 220 between ones of the machines 215*a-n* and may use sensor data from sensors on the connectors 220 to improve accuracy of the modeling.

In embodiments, and as described herein, the server 210 may determine schedules of different activities that will be performed in the industrial system 207 at futures times. The server 210 my use the activity history knowledge base 260 to determine specifications of each activity, such as date, time, payload, sequence workflow, time required, etc. The data contained in the activity history knowledge base 260 may be captured based on how the same and similar activities were performed in the past. The server 210 may perform historic learning with the data in the activity history knowledge base 260 to create a knowledge corpus about the different activities. In embodiments, and as described herein, when an activity is predicted to be performed, the server 210 may run simulations of the industrial system 207, using the digital twin, based on this activity and other activities predicted being performed at the same time. In embodiments, the server 210 determines specifications of the machines performing the activity, types, and dimension of the machine parts to calculate a spring constant for the equation $c_c=2\sqrt{mk}$ where $c_c$ is the critical damping coefficient, m is the mass, and k is the spring constant. In embodiments, and based on the predicted activity, the server 210 determines an amount of mass and a location of the amount of the amount of mass to attenuate a vibration in the industrial system 207. In embodiments, and as described herein, the digital twin is used to model attenuating vibrations by changing the damping ratio of an element of the industrial system 207 by changing the mass of the element as a result of adding different amount of mass to different locations on the element. In embodiments, and as described herein, the server 210 runs simulations of vibrations in the entire industrial system 207, which may be used to determine which machines cause which vibrations, paths of propagation of the vibrations in the industrial system 207, and amounts of mass and locations to add the mass to best attenuate the vibrations, e.g., by changing the damping ratio of elements in the industrial system 207. Based on these determinations, the server 210 may control the robot 235 to place one or more objects 240*a-m* at the locations in the industrial system 207 to attenuate the vibrations by changing the damping ratio of one or more elements of the industrial system 207.

In embodiments, and as described herein, the server 210 uses sensors in the industrial system 207 to collect vibration data that is used in the digital twin modeling of the vibrations of the industrial system 207. Different types of sources of vibration can be detected with such sensors, and acoustic analysis with an array of microphone can also identify a three-dimensional position of a source of a vibration in the industrial system 207. This data may be used to increase the accuracy of the modeling performed using the digital twin. This data may also be used to help determine a source of a particular vibration, e.g., which activity of which machine 215*a-n* is associated with a particular vibration as described herein. In one example, the server 210 may distinguish the difference between sources of a vibration by analyzing the intensity of the vibration using the sensor data with the digital twin modeling. In another example, the server 210 may determine a propagation path and propagation pattern of a vibration using the sensor data with the digital twin modeling. The digital twin may be programmed to account for specifications of elements in the industrial system 207, such as cross sectional areas of elements and material properties of elements, and how these specifications affect vibration in the vibration modeling. The digital twin may be programmed to identify a natural frequency and different vibration propagation nodes of a vibration in the industrial system.

In embodiments, and as described herein, the server 210 may maintain a list of the different objects 240*a-m* and a respective mass of each one of the objects 240*a-m*. The server 210 may also maintain a list of a respective location of each one of the objects 240*a-m* in the industrial system 207, and may update the list when any one of the objects 240*a-m* is moved by the robot 235 to another location. The server 210 may also maintain a list of which ones of the objects 240*a-m* are, and which ones are not, currently being used for vibration attenuation, and may update the list when one any one of the objects has a status change in this regard.

Figure 3:
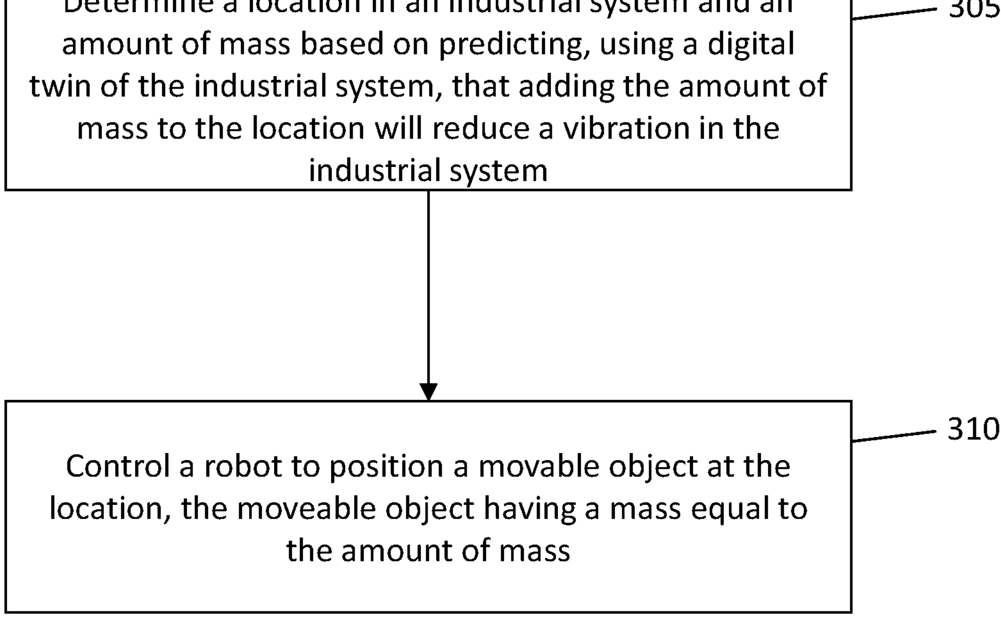
FIG. 3 shows a flowchart of an exemplary method in accordance with aspects of the present invention.

FIG. 3 shows a flowchart of an exemplary method in accordance with aspects of the present invention. Steps of the method may be carried out in the environment of FIG. 2 and are described with reference to elements depicted in FIG. 2.

At step 305, the system determines a location in an industrial system and an amount of mass. In embodiments, and as described with respect to FIG. 2, the server 210 determines the location and the amount of mass based on predicting, using a digital twin of the industrial system 207, that adding the amount of mass to the location will reduce a vibration in the industrial system 207.

At step 310, the system controls a robot to position a movable object at the location. In embodiments, and as described with respect to FIG. 2, the server 210 sends control signals to the robot 235 that cause the robot to move one or more of the objects 240*a-m* at the location determined at step 305. In embodiments, and as described with respect to FIG. 2, the mass of the one or more of the objects 240*a-m* positioned by the robot 235 equals the amount of mass determined at step 305, where equals refer to an exact match or a closest possible match given a finite number of objects 240*a-m* from which to choose.

In embodiments of the method, the digital twin comprises a digital model that models vibrations in the industrial system 207. In one example, the digital twin models the vibrations in the industrial system based on machines 215*a-n* in the industrial system, structures 225 in the industrial system, and connectors 220 in the industrial system. In another example, the digital twin models the vibrations in the industrial system based on machines 215*a-n* in the industrial system, structures 225 in the industrial system, connectors 220 in the industrial system, and one or more external factors that influence the vibrations in the industrial system. In embodiments of the method, the predicting comprises running simulations with the digital twin, where the simulations include analyzing vibrations in the industrial system with different amounts of mass added at different locations in the industrial system.

In embodiments, the method further comprises determining an activity in the industrial system, wherein the vibration in the industrial system is caused by the activity, and wherein determining the location and the amount of mass is based on reducing the vibration in the industrial system caused by the activity. In embodiments of the method, the determining the activity comprises predicting the activity based on historic learning, and the controlling the robot is performed prior to a start of the activity. In embodiments of the method, the activity is one of a plurality of activities, each of the plurality of activities is associated, respectively, with one of a plurality of vibrations in the industrial system, the plurality of vibrations are ranked in a prioritized order, and the controlling the robot is based on a highest ranked one of the plurality of vibrations. In embodiments, the method further comprises determining a change in the plurality of activities, and controlling the robot to reposition the movable object in the industrial system based on the change in the plurality of activities. In embodiments, the method further comprises, in response to determining that a particular one of the plurality of vibrations associated with a particular one of the plurality of activities cannot be sufficiently attenuated by adding mass to the industrial system, generating an alert advising a repair of a machine associated with the particular one of the plurality of activities.

In embodiments, a service provider could offer to perform the processes described herein. In this case, the service provider can create, maintain, deploy, support, etc., the computer infrastructure that performs the process steps of the method for one or more customers. These customers may be, for example, any business that uses technology. In return, the service provider can receive payment from the customer (s) under a subscription and/or fee agreement and/or the service provider can receive payment from the sale of advertising content to one or more third parties.

In still additional embodiments, aspects of the invention provides a computer-implemented method, via a network. In this case, a computer infrastructure, such as computer 101 of FIG. 1, can be provided and one or more systems for performing the process steps of the method can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the process steps of the method.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method, comprising:

determining, by a processor set, a location in an industrial system and an amount of mass based on predicting, using a digital twin of the industrial system, that adding the amount of mass to the location will reduce a vibration in the industrial system;

controlling, by the processor set, a robot to position a movable object at the location, the movable object having a mass equal to the amount of mass; and determining an activity in the industrial system, wherein the vibration in the industrial system is caused by the activity, wherein determining the location and the amount of mass is based on reducing the vibration in the industrial system caused by the activity, and wherein:

the activity is one of a plurality of activities;

each of the plurality of activities is associated, respectively, with one of a plurality of vibrations in the industrial system;

the plurality of vibrations are ranked in a prioritized order; and the controlling the robot is based on a highest ranked one of the plurality of vibrations.

2. The computer implemented method of claim 1, wherein the digital twin comprises a digital model that models vibrations in the industrial system.

3. The computer implemented method of claim 2, wherein the digital model models the vibrations in the industrial system based on machines in the industrial system, structures in the industrial system, and connectors in the industrial system.

4. The computer implemented method of claim 2, wherein the digital model models the vibrations in the industrial system based on machines in the industrial system, structures in the industrial system, connectors in the industrial system, and one or more external factors that influence the vibrations in the industrial system.

5. The computer implemented method of claim 2, wherein the predicting comprises running simulations with the digital twin, the simulations including analyzing vibrations in the industrial system with different amounts of mass added at different locations in the industrial system.

6. The computer implemented method of claim 1, wherein:

the determining the activity comprises predicting the activity based on historic learning; and the controlling the robot is performed prior to a start of the activity.

7. The computer implemented method of claim 1, further comprising:

determining a change in the plurality of activities; and controlling the robot to reposition the movable object in the industrial system based on the change in the plurality of activities.

8. The computer implemented method of claim 1, further comprising, in response to determining that a particular one of the plurality of vibrations associated with a particular one of the plurality of activities cannot be sufficiently attenuated by adding mass to the industrial system, generating an alert advising a repair of a machine associated with the particular one of the plurality of activities.

9. A computer program product comprising one or more non-transitory computer readable storage media having program instructions collectively stored on the one or more non-transitory computer readable storage media, the program instructions executable to:

determine a location in an industrial system and an amount of mass based on predicting, using a digital twin of the industrial system, that adding the amount of mass to the location will reduce a vibration in the industrial system;

control a robot to position a movable object at the location, the movable object having a mass equal to the amount of mass; and determine an activity in the industrial system, wherein the vibration in the industrial system is caused by the activity and the determining the location and the amount of mass is based on reducing the vibration in the industrial system caused by the activity, and wherein:

the activity is one of a plurality of activities;

each of the plurality of activities is associated, respectively, with one of a plurality of vibrations in the industrial system;

the plurality of vibrations are ranked in a prioritized order; and the controlling the robot is based on a highest ranked one of the plurality of vibrations.

10. The computer program product of claim 9, wherein:

the digital twin comprises a digital model that models vibrations in the industrial system; and the predicting comprises running simulations with the digital twin, the simulations including analyzing vibrations in the industrial system with different amounts of mass added at different locations in the industrial system.

11. The computer program product of claim 10, wherein the digital model models the vibrations in the industrial system based on machines in the industrial system, structures in the industrial system, and connectors in the industrial system.

12. The computer program product of claim 9, wherein:

the determining the activity comprises predicting the activity based on historic learning; and the controlling the robot is performed prior to a start of the activity.

13. A system comprising: a processor set, one or more non-transitory computer readable storage media, and program instructions collectively stored on the one or more non-transitory computer readable storage media, the program instructions executable to:

determine a location in an industrial system and an amount of mass based on predicting, using a digital twin of the industrial system, that adding the amount of mass to the location will reduce a vibration in the industrial system;

determine an activity in the industrial system, wherein the vibration in the industrial system is caused by the activity, and determining the location and the amount of mass is based on reducing the vibration in the industrial system caused by the activity, and wherein:

the activity is one of a plurality of activities;

each of the plurality of activities is associated, respectively, with one of a plurality of vibrations in the industrial system; and the plurality of vibrations are ranked in a prioritized order;

control a robot to position a movable object at the location, the movable object having a mass equal to the amount of mass, wherein the controlling the robot is based on a highest ranked one of the plurality of vibrations;

determine a change in the plurality of activities; and control the robot to reposition the movable object in the industrial system based on the change in the plurality of activities.

14. The system of claim 13, wherein:

the digital twin comprises and digital model that models vibrations in the industrial system; and the predicting comprises running simulations with the digital twin, the simulations including analyzing vibrations in the industrial system with different amounts of mass added at different locations in the industrial system.

* * * * *